United States Patent [19]

Hart et al.

[11] Patent Number: 5,044,698

[45] Date of Patent: Sep. 3, 1991

[54] FREIGHT BRAKE CONTROL VALVE HAVING LAP LEAKAGE PROTECTION

[75] Inventors: James E. Hart, Trafford; Charles L. Weber, Jr., N. Huntingdon, both of Pa.

[73] Assignee: Westinghouse Air Brake Company, Wilmerding, Pa.

[21] Appl. No.: 574,718

[22] Filed: Aug. 29, 1990

[51] Int. Cl.⁵ .................... B60T 15/42; B60T 17/04
[52] U.S. Cl. ........................... 303/33; 303/35; 303/38; 303/41
[58] Field of Search ............... 303/35, 33, 40, 56, 303/54, 55, 28, 38

[56] References Cited

U.S. PATENT DOCUMENTS

| | | | |
|---|---|---|---|
| 2,032,145 | 2/1936 | Nelson | 303/35 X |
| 2,055,967 | 9/1936 | Campbell | 303/35 X |
| 4,776,642 | 10/1988 | Hart et al. | 303/41 X |
| 4,974,910 | 12/1990 | Hart | 303/35 X |

*Primary Examiner*—Matthew C. Graham
*Assistant Examiner*—Peter M. Poon
*Attorney, Agent, or Firm*—G. J. Falce

[57] ABSTRACT

A service valve piston assembly for a freight brake control valve device in which the graduating valve is configured to cooperate with the associated slide valve to close off the application port via which auxiliary reservoir pressure acting on one side of the piston assembly feeds the brake cylinder prior to opening of the stability port via which the brake pipe pressure on the opposite side of the piston assembly is communicated with auxiliary reservoir pressure on the one side of the piston, thereby preventing the piston valve assembly from finding a quasi-lap position in which the brake cylinder continues to be pressurized.

17 Claims, 4 Drawing Sheets

FREIGHT BRAKE CONTROL VALVE HAVING LAP LEAKAGE PROTECTION

BACKGROUND OF THE INVENTION

The present invention is related to freight brake control valve devices and in particular to the cooperative arrangement between the graduating valve and slide valve of the service piston that provides the service brake control functions of the control valve device.

The well-known ABD and ABDW Control Valve devices manufactured by the Westinghouse Air Brake Co. employ a graduating valve that is carried fast with the service piston and a slide valve that is carried by the service piston through a lost-motion arrangement, so that relative movement can occur between the graduating valve and slide valve when the service piston is initially actuated from a release position to an application position and vice-versa. This relative movement between the graduating valve and slide valve provides for valve operation through the sliding engagement between adjoining lap fit faces thereof.

For example, in application position, an application passage in the slide valve is connected to the control valve brake cylinder passage at the slide valve/bushing interface, and the back end of the graduating valve uncovers a feed port of this application passage at the graduating valve/slide valve interface, to thereby supply auxiliary reservoir air effective on one side of the service piston to the brake cylinder When the auxiliary reservoir air pressure is accordingly reduced to approximately the pressure of the brake pipe air acting on the opposite side of the service piston, a spring forces the service piston back toward release position. During this initial release movement, however, only the graduating valve moves with the service piston, due to the lost-motion connection between the service piston and slide valve. Consequently, the uncovered feed port at the slide valve is lapped or covered by the graduating valve to terminate the supply of air to the brake cylinder. When this occurs, the service piston is in a lap position and no additional increase or decrease of brake cylinder pressure should occur.

It is known, however, that when the brakes are lapped for an extended period of time, such as when a train is descending a long grade, for example, a slight leakage at the graduating valve can cause the brake cylinder pressure to gradually creep up, so that a higher brake pressure than intended develops.

While leakage does not occur during the expected normal operation of the valve, the sequencing of port opening and closing by the graduating valve as it moves to service lap position does not positively prevent this "leak-up" of brake cylinder pressure.

The undesired buildup of brake cylinder pressure in service lap can conceivably occur in a valve having an abnormally high resistance due to the fact that another passage in the slide valve, known as the stabilizing passage, which is intended to be uncovered by the graduating valve in this lap position, in fact opens just prior to the application passage becoming lapped. This stabilizing passage establishes communication between the one side of the service piston that is subject to auxiliary reservoir air and the opposite side of the piston that is subject to brake pipe air, in order to dampen out spurious pressure variations therebetween. However, in opening the stabilizing passage prior to closure of the application passage, it is possible that both of these passages can be cracked open at the same time, in a certain position of the service piston. This allows auxiliary reservoir air to leak to the brake cylinder. Normally this would result in a reduction of auxiliary reservoir pressure on the one side of the service piston relative to brake pipe pressure on the opposite side to cause the service piston to move further toward release and positively lap off the feed port of the application passage. However, since the stabilizing passage is also cracked open, brake pipe pressure maintains the leakage of auxiliary reservoir air to the brake cylinder, so that no reduction of auxiliary reservoir pressure can occur. Therefore, the service piston can remain stalled in this position, allowing auxiliary reservoir air to continue to leak to the brake cylinder.

The object of the invention is to reverse the valve sequence by which the stability port and feed port connections are controlled, in order to better assure a positive cut off of the brake cylinder supply in service lap position.

Another object of the invention is to achieve the foregoing objective in a simple, low-cost manner.

Briefly, these objectives are achieved by providing a control valve device comprising a piston member subject on one side to the fluid under pressure effective in a brake pipe and on the opposite side to the fluid under pressure in an auxiliary reservoir charged to the pressure carried in the brake pipe, a tailpiece projecting from the opposite side of the piston member and having a face in which a recess is formed, a graduating valve carried fast in the recess so as to be movable axially with the piston member and having a first planar surface, a slide valve carried by the piston member with relative movement therebetween, the slide valve having a second planar surface slidably engaged with the first planar surface, a first passage in the slide valve via which fluid under pressure is supplied from said opposite side of said piston member to said brake cylinder device when the piston member is actuated from a release position to an application position, the first passage having an opening in the second planar surface that is uncovered by the graduating valve in application position, and a second passage in the slide valve via which fluid pressure communication is established between the brake pipe and the other side of the piston member, the second passage having an opening in the second planar surface axially displaced from the opening of the first passage, the first planar surface having an axial dimension at least as great as the maximum axial distance between the openings of the first and second passages, such that the opening of the first passage is covered by the graduating valve when the opening of the second passage is uncovered by the graduating valve in a lap position intermediate the application and release positions.

BRIEF DESCRIPTION OF THE DRAWINGS

The foregoing objective and other objects and advantages of the invention will be apparent from the following more detailed explanation when taken in conjunction with the accompanying drawings in which.

DESCRIPTION AND OPERATION

The invention will be explained initially with reference to the known ABD control valve service piston assembly 1 shown in FIGS. 1, 2 and 3. Service piston assembly 1 includes a service piston 2, a bushing 3 having a bore 4 in which piston 2 is operably disposed for axial movement, a slide valve 5 carried by piston 2 having a face 6 engageable with an adjoining face 7 of bushing 3 that forms a slide valve seat, and a graduating valve 8 having a face 9 engageable with an adjoining face 10 of slide valve 5 that provides a graduating valve seat.

Formed on opposite sides of service piston 2 are pressure chambers 11 and 12 which are connected respectively to the train brake pipe 13 via a pipe and passage 13a, and to an auxiliary reservoir 14 via a pipe and passage 14a. A branch pipe and passage 13b of brake pipe 13 is connected to bushing face 7 via a charging choke 13c. The aforementioned pipe connections to the control valve device are only shown in FIG. 3, having been omitted from FIGS. 1 and 2 for the sake of clarity.

A stabilizing spring 15 is carried in a tailpiece 16 of piston 2 between a spring guide 17 and a spring seat 18. Tailpiece 16 is integral with piston 2, projecting from the side thereof adjacent chamber 12 into the bore 4 of bushing 3, this area within bore 4 and surrounding tailpiece 16 being open to chamber 12 via a channel 19 formed in a guide member 20 of piston tailpiece 16.

Formed between piston guide member 20 and spring guide 17 is a first recess 21 in the face of tailpiece 16, in which slide valve 5 is carried with a lost-motion connection with piston 2.

Also formed in the face of tailpiece 16 is another recess 22 of recess 21, in which graduating valve 8 is carried by piston 2. The axial lengths of recess 22 and graduating valve 8 are substantially the same, so that graduating valve 8 is fixed fast to piston 2 in the axial direction. Spring guide 17 is carried in the end of tailpiece 16 within a further recess 23 that penetrates the one end of recess 21. Being spring-loaded, spring guide 17 is deflectable upon engagement with slide valve 5 to provide the aforementioned lost-motion connection of slide valve 5 with piston 2.

Slide valve 5 is provided with an auxiliary reservoir charging passage 24, an emergency reservoir charging passage 25, a stabilizing passage 26 that is a branch of passage 25, having a stability choke 26a, and an application passage 27, the aforementioned passages extending between slide valve faces 6 and 10. Also formed in face 6 of slide valve 5 is a groove 28 that either establishes or cuts off communication between a pipe and passage 29 leading from a brake cylinder device 30 to the bore 4 of bushing 3 and an exhaust passage 31 that leads from bore 4 to atmosphere. Finally, a pipe and passage 32 leads from bore 4 of bushing 3 to an emergency reservoir 33.

A butterfly type leaf spring 34 is carried on bifurcated arms 35 of slide valve 5 between which tailpiece 16 passes. The active ends of leaf spring 34 press against the bore 4 of bushing 3 opposite face 7 to load slide valve 5, so that in conjunction with the lapped surface between faces 6 and 7, a pressure seal is established at the slide valve/bushing interface. Similarly, a pressure seal is established between the adjoining faces 9 and 10 of graduating valve 8 and slide valve 5 by the combined effect of the lap fit therebetween and the loading of a helical spring 36 between graduating valve 8 and tailpiece 16.

Figure 1:
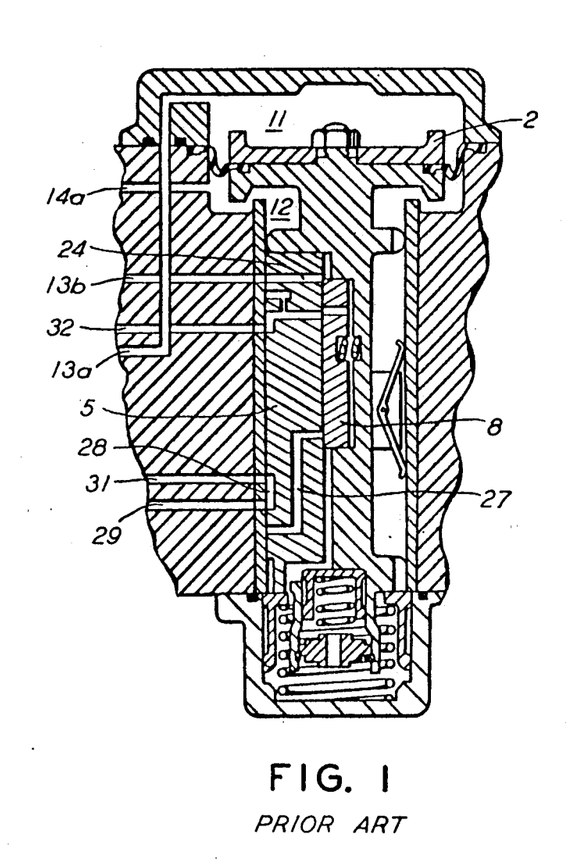
FIGS. 1, 2 and 3 are diagrammatic views of a service valve piston assembly used in a known control valve device shown in its release, application, and lap positions respectively.
Figure 2:
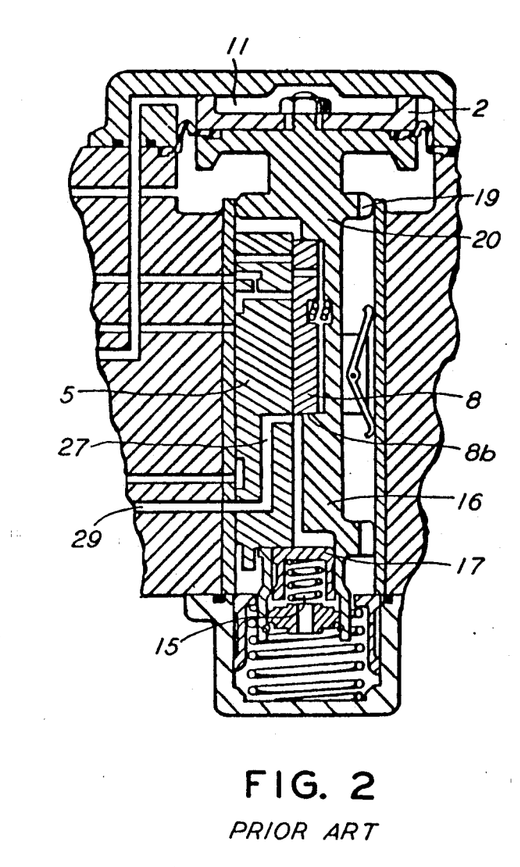
Figure 3:
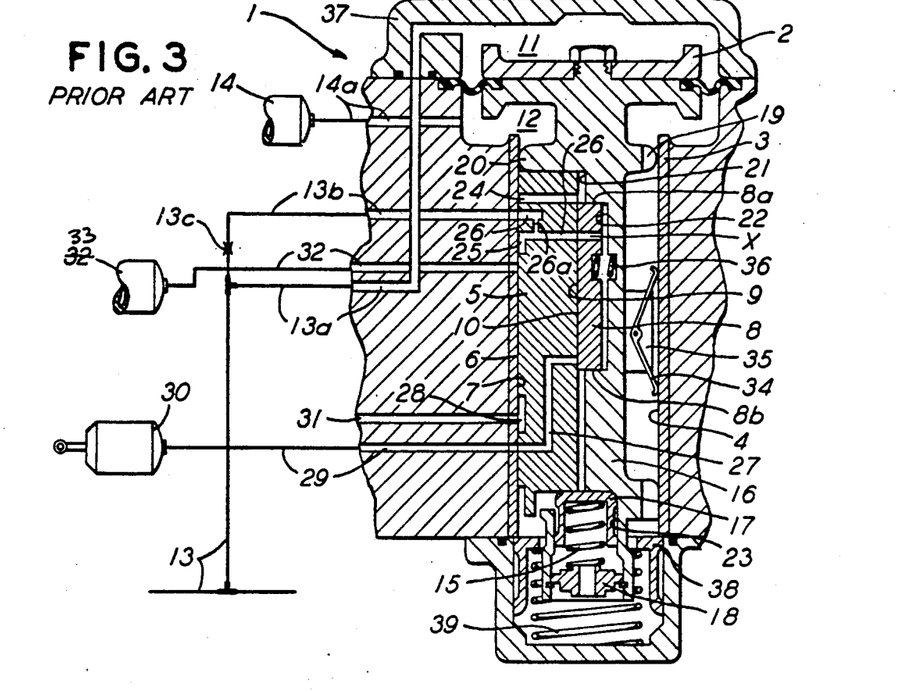

A top cover 37 provides a stop to limit upward movement of piston 2 and thereby establish a service application position, as shown in FIG. 2, while a spring seat 38, that is maintained by a helical spring 39 in engagement with the end of bushing 3, provides a spring-caged stop with which piston 2 is engageable to establish a release and charging position, as shown in FIG. 1. In providing a spring-caged stop, piston 2 can be forced beyond release position to a retarded recharge position, which forms no part of the present invention.

In addition, other ports and passages have been eliminated relating to the quick service and accelerated release functions, for purposes of clarity, as these functions also are unrelated to the present invention.

Figure 11:
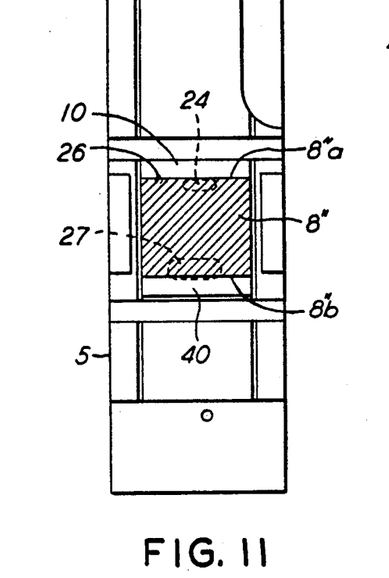
FIGS. 11 and 12 are views of an actual slide valve/grad valve combination corresponding to the diagrammatic showing represented by FIGS. 9 and 10, to show the slide valve porting provided by the present invention.
Figure 12:
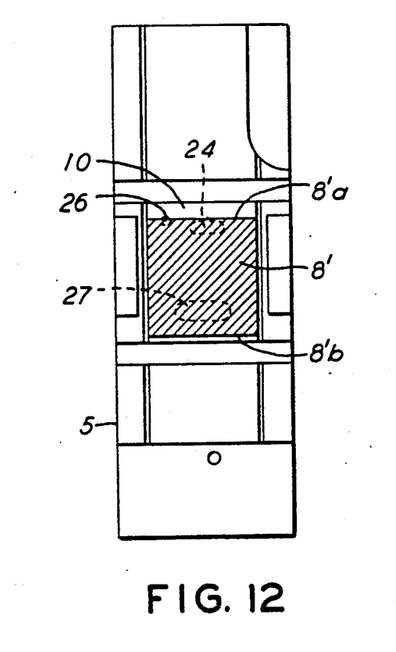

While a single passage X is shown in graduating valve 8 between face 9 and the face adjacent recess 22, this passage X is only representative of the front side 8a of graduating valve 8, since it can be seen from FIGS. 11 and 12 that front side 8a controls the porting of stability passage 26, as well as the auxiliary reservoir charging passage 24. Passage X does not exist in the actual graduating valve.

In release position of service piston 2, as shown in FIG. 1, chamber 11 is charged with pressure directly from brake pipe 13 via pipe and passage 13a. The relative alignment of slide valve 5 and graduating valve 8 is such that chamber 12 is concurrently charged with pressure from brake pipe 13 via pipe and passage 13b, charging choke 13c, and charging passage 24 in slide valve 5. Being communicated with chamber 12 via pipe and passage 14a, auxiliary reservoir is accordingly charged to the pressure carried in brake pipe 13, the rate of such charging being controlled by choke 13c to assure that the charging of chamber 11 leads that of chamber 12. In this manner, a downward acting pressure differential is established across piston 2 to maintain piston 2 in release position. Also, in release position, emergency reservoir 33 is charged with pressure from chamber 12 via passage 25, in slide valve 5, and pipe and passage 32.

Also in this release position of piston 2, slide valve application passage 27 is cut off from brake cylinder pipe and passage 29 at the bushing/slide valve interface to interrupt the supply of auxiliary reservoir air to brake cylinder 30, and groove 28 communicates brake cylinder pipe and passage 29 with exhaust passage 31, to establish a release condition of the brakes.

Upon a subsequent reduction of brake pipe pressure to initiate a service brake application, in a well-known manner, a pressure differential is created between chambers 11 and 12, due to choke 13c preventing the auxiliary reservoir pressure in chamber 12 from reducing at the same rate as the brake pipe pressure in chamber 11. Accordingly, piston 2 is subject to an upward-acting pressure differential sufficient to move piston 2 from release position to application position. Initially, this movement of piston 2 and graduating valve 8 occurs relative to slide valve 5, which remains stationary, due to its lost-motion connection with piston 2, until engaged by spring guide 17. In this intermediate position of piston 2 between release and application positions, a quick service function occurs, which is not a part of the present invention and therefore is not shown nor explained, but is well-known and understood by those skilled in the art. Compression of stabilizing spring 15 following engagement of spring guide 17 with slide valve 5, as piston 2 continues to move upwardly, provides sufficient upward force on slide valve 5 to move it in an upward direction together with piston 2 and graduating valve 8 to application position. As shown in FIG. 2, the back side or trailing edge 8b of graduating valve 8, that is the edge adjacent stabilizing spring 15, uncovers the port of application passage 27 at the graduating valve/slide valve interface. At the slide valve/bushing interface, this application passage 27 is aligned with brake cylinder passage 29. Auxiliary reservoir pressure is thus supplied from chamber 12, past channel 19 in the piston tailpiece guide 20 to the area surrounding tailpiece 16, and thence to brake cylinder 30 via the application port connection 27, 29.

As the brake cylinder pressure accordingly builds up, there is a gradual reduction of auxiliary reservoir pressure effective in chamber 12 until such time the application differential between brake pipe and auxiliary reservoir pressure is reduced sufficiently to allow the force of compression of stabilizing 15 to force piston 2 in a downward direction from application position toward release position. Again, this initial downward movement of piston 2 and graduating valve 8 occurs without corresponding downward movement of slide valve 5, due to the lost-motion connection between piston 2 and slide valve 5, until piston tailpiece guide 20 forming one edge of recess 21 engages the leading edge or front side 8a of slide valve 5, that is the edge farthest removed from stabilizing spring 15. This defines a lap position of piston 2 between application and release positions, as shown in FIG. 3.

Due to the inherent resistance to piston movement, and the fact that the downward acting force of stabilizing spring 15 is reduced as piston 2 moves back toward release position from application position, the release differential in response to which downward movement of piston 2 was initiated is insufficient to maintain continued downward movement of piston 2 beyond initial lap position and piston 2 becomes stabilized. In this stabilized lap position, the port of application passage 27 is covered by the trailing or back edge 8b of graduating valve 8 at the slide valve/graduating valve interface, to terminate any further supply of air from auxiliary reservoir 14 to brake cylinder 30. Also, a port of stabilizing passage 26 at the slide valve/graduating valve interface is connected to the area surrounding tailpiece 16 by graduating valve 8, such connection being represented diagrammatically by passage X in FIG. 3. This latter connection allows gradual changes in auxiliary reservoir pressure effective in chamber 12, due to leakage and temperature changes for example, to be dissipated without effecting the lap pressure differential across piston 2. Ideally, this lap pressure differential across piston 2 should remain constant until such time as a further change in the brake pipe pressure occurs.

Figure 4:
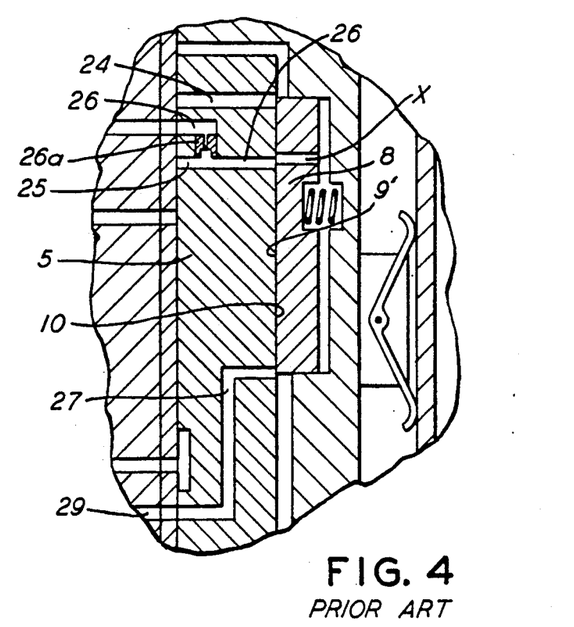
FIG. 4 is a partial view of the service valve piston assembly of FIG. 3 shown enlarged to illustrate a specific condition with which the instant invention is concerned.
Figure 5:
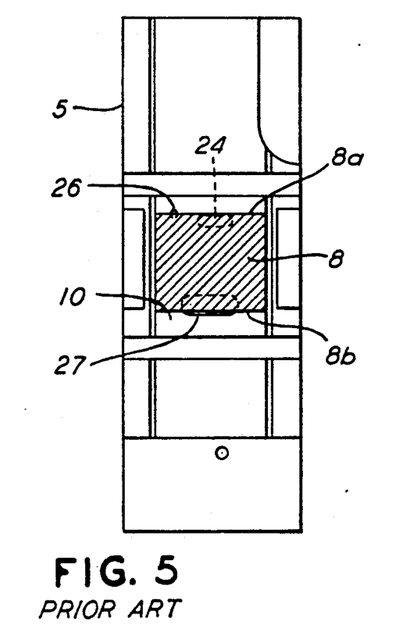
FIG. 5 is a plan view of an actual slide valve/grad valve combination corresponding to the diagrammatic showing represented in FIG. 4, to show the slide valve 5 porting capable of existing in the prior art.

It has been found, however, that piston 2, in moving from application position toward lap position, as explained, can find a quasi-lap position in which the piston 2 becomes stable prior to the port of application passage 27 at the slide valve/graduating valve interface becoming completely closed by the back side 8b of graduating valve 8. This is more clearly illustrated in the enlarged view of FIG. 4, where it can be seen that the port of application passage 27 is uncovered slightly by the back side 8b of graduating valve 8 while at the same time, the port of stability passage 26 is also uncovered by the front side of graduating valve 8, represented diagrammatically by grad valve passage X. In that both of these ports are open concurrently, it will be appreciated that auxiliary reservoir air is not lapped off, but can, in fact, continue to flow to brake cylinder 30 at a very slow rate via the application port, passage 27 and brake cylinder pipe and passage 29. Since the stability port is also open, the auxiliary reservoir pressure is, in turn, supplied from brake pipe 13, charging choke 13c, pipe and passage 13b, stability choke 26a, and the ports of passages 26 and X. In actual practice, the leading edge 8a of grad valve 8 controls the opening and closing of the stability port of passage 26, as shown in FIG. 5, it being understood that the diagrammatic showing of passage X in FIG. 3 is only for purposes of illustration. Consequently, the effective pressure differential across piston 2 remains constant, so that no further movement of piston 2 can occur. Thus, the piston 2 remains stalled in this quasi-lap position, in which auxiliary reservoir air continues to leak off to the brake cylinder, as long as the brake application remains in effect. Obviously, in descending long grades where standard operating practice dictates that a given brake application be maintained for a relatively long time, such a false lap condition can result in a significant increase in the brake cylinder pressure that could bring the train to an undesired stop.

Figures 6, 7, 8:
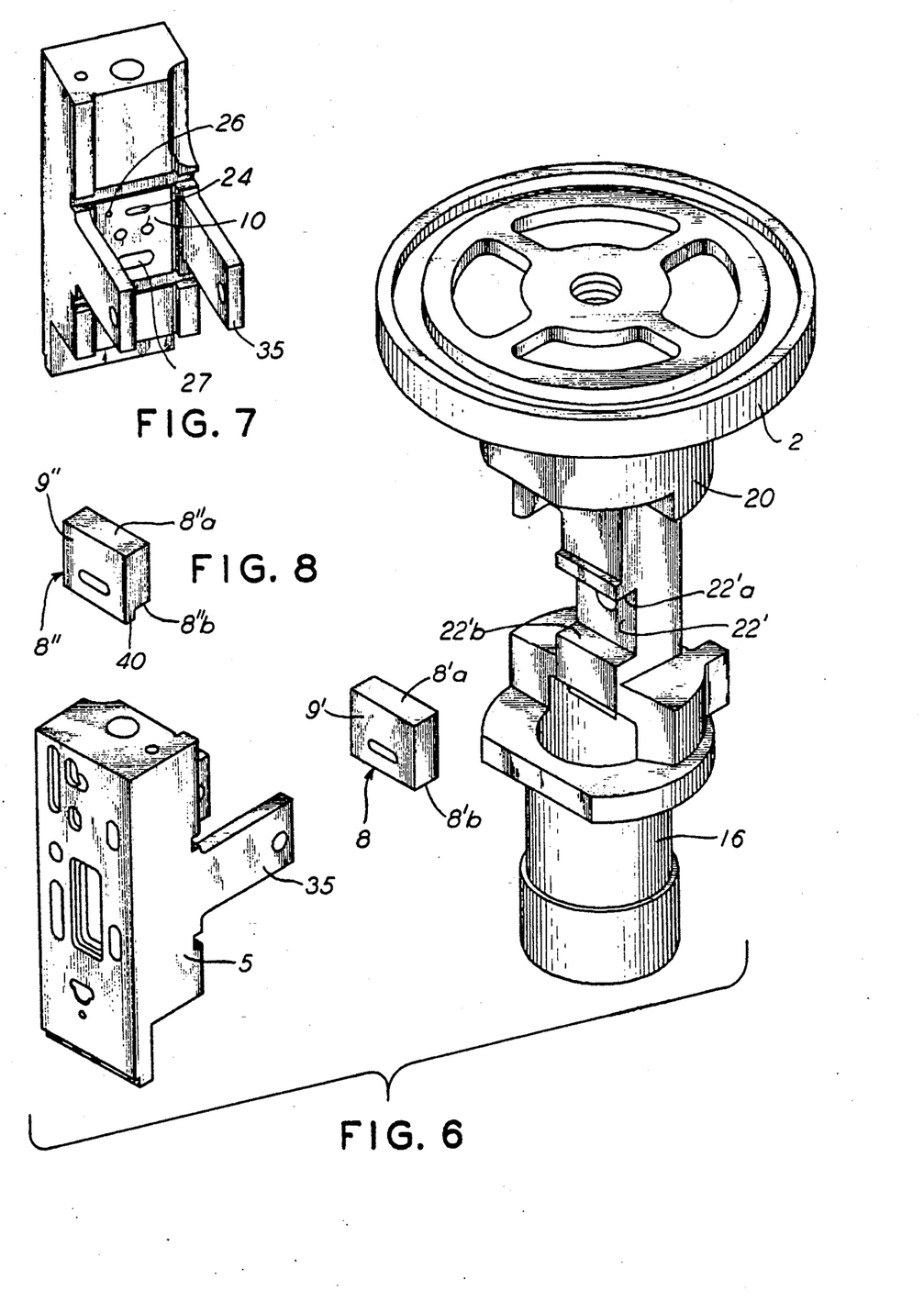
FIG. 6 is an exploded view of the service valve piston assembly of FIGS. 1, 2 and 3 shown in isometric projection including one embodiment of the grad valve employed in the present invention.
FIG. 7 is an isometric projection of the slide valve of FIG. 6 rotated to show the ports in the face thereof that serves as the graduating valve seat.
FIG. 8 is an isometric projection of another modification of the graduating valve according to the present invention.

While FIGS. 1–4 attempt to illustrate this condition diagrammatically, it will be understood that the porting of passages 24 and 25 in slide valve 5 is arranged in actual practice, as shown in the isometric view of FIG. 7, where it will be seen that the port of stability passage 26 of slide valve 5 is axially spaced-apart from the port of application passage 27 a greater distance than the port of charging passage 25.

Figure 10:
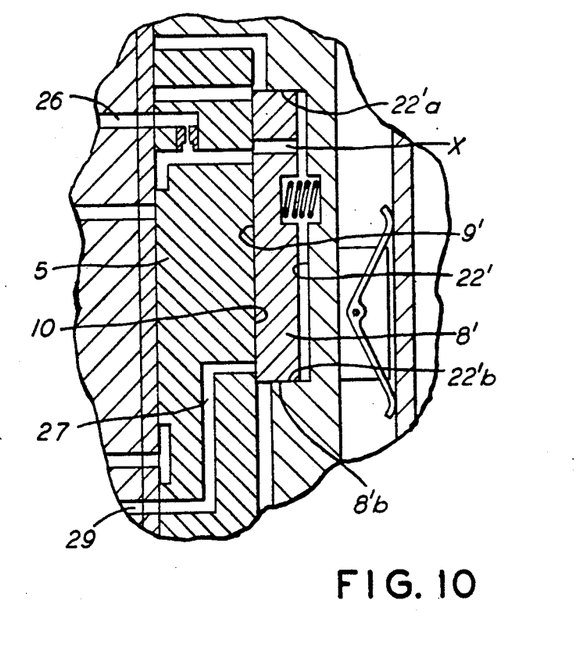

In one embodiment of the invention, as shown in FIGS. 6, 10 and 12, a modified graduating valve 8' is provided having an axial dimension that is greater than that of known graduating valves 8, in order to extend the graduating valve face 9'. In order to accommodate this increased length of graduating valve 8', the axial dimension of recess 22' is also increased a corresponding amount. Preferably, this increased axial dimension of recess 22' is obtained by relocating the back side wall 22'b of recess 22'. The forward side wall 22'a of recess 22' is located in the same position relative to slide valve 5, so that the degree of compression of stabilizing spring 15 remains unchanged, when the forward edge 8'a of graduating valve 8' cuts off the ports of auxiliary reservoir charging passage 24 during piston movement out of release position. This assures that the differential between brake pipe and auxiliary reservoir pressures necessary to move piston 2 to application position is unaffected by this modification according to the above-discussed embodiment of the invention. By extending the length of the graduating valve face 9', a sequence of porting is achieved at the slide valve/graduating valve interface, during movement of piston 2 from application toward release position, which assures complete and positive cut-off of the application port of passage 29 by the back side 8'b of graduating valve 8' prior to the stability port of passage 26 being uncovered by the front side 8'a of graduating valve 8. Under no circumstances can the stability port be uncovered without the application port being lapped.

Figure 9:
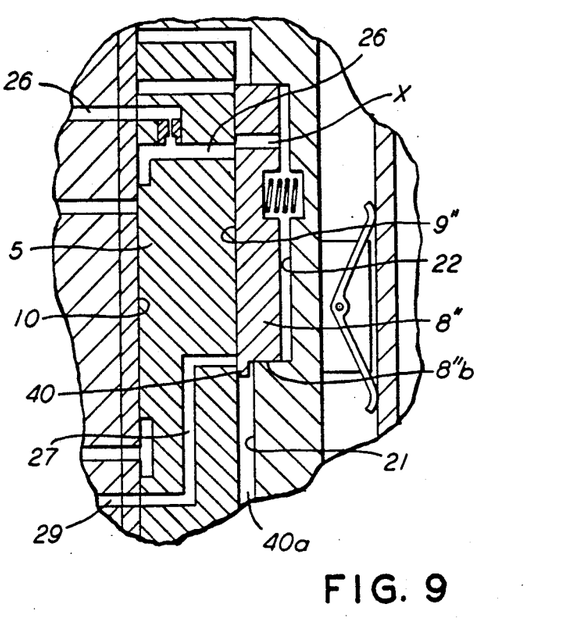
FIGS. 9 and 10 are partial enlarged views of a service valve piston assembly similar to FIG. 4, but employing the graduating valves of FIGS. 6 and 8, respectively.

It will be appreciated, therefore, that in the event piston 2 tends to stall in a quasi-lap position, i.e., prior to the application port being positively lapped, the stability port will remain lapped, so that the auxiliary reservoir air supplying brake cylinder 30 via the application port can not be maintained by brake pipe air supplied via the stability port. Consequently, auxiliary reservoir air will continue to flow to brake cylinder 30, thereby increasing the lap differential across piston 2 sufficiently to force piston 2 to continue movement toward release position until the back side 8'b of graduating valve 8' positively covers the application port of passage 27. In this manner, positive lap position is obtained following each application of the brakes, as shown in FIG. 9, without the possibility of the brake pressure leaking up. The axial dimension of graduating valve 8', according to the present invention, is at least 0.605 in., but less than 0.648 in., so as to be greater than the maximum axial dimension between the ports of application passage 29 and stability passage 26, by an amount sufficient to assure a lap pressure seal at the application port, at the time the stability port is uncovered.

While the above-discussed embodiment of the invention is viable for the new manufacture of control valves, it is not economically feasible for modifying existing ABD/ABDW type control valves, because of the additional cost that would be required to machine the existing standard sized recess 22 to accommodate the increased length of graduating valve 8'. This, of course, is not a consideration in new manufacture, since it is no more costly to die cast tailpiece 16 with a larger recess 22' than it is to die cast a standard sized recess.

The second embodiment of the invention, as shown in FIGS. 8, 9 and 11, addresses a graduating valve configuration that makes it possible to incorporate the feature of the present invention without having to modify any parts other than the graduating valve itself. In this sense, a modified graduating valve 8" is provided having a lip 40 that is formed preferrably at the back side 8"b of graduating valve 8". This lip 40 is flush with the surface of graduating valve face 9" to extend its axial length, and projects into the space 40a between slide valve face 10 and the face of recess 21, without engaging the latter, due to the fact that the height of lip 40 is less than the aforementioned space in which it projects. In this manner, the axial dimension of graduating valve 8" at its face 9" can be made greater than that of known graduating valves 8, without requiring any change whatsoever in recess 22. This dimension is at least as great as the maximum axial dimension between the ports of application passage 29 and stability passage 26, but preferably greater by an amount sufficient to assure a lap pressure seal at the application port, at the time the stability port is uncovered. Preferably, this dimension is at least 0.605 in., but not greater than 0.648 in.

The advantage of increasing the axial length of graduating valve 8" is the same as discussed relative to graduating valve 8' and therefore does not need to be repeated for an understanding of how the invention operates.

We claim:

1. For use on a railway car having a brake pipe charged with fluid at a certain chosen pressure, an auxiliary reservoir charged with fluid at said certain chosen pressure, a brake cylinder device, and a control valve device for controlling pressurization of said brake cylinder device, said control valve device comprising:

(a) a piston member subject on one side thereof to the fluid pressure effective in said brake pipe and on the opposite side thereof to the fluid pressure effective in said auxiliary reservoir;

(b) a tailpiece projecting from said opposite side of said piston member;

(c) a face of said tailpiece having a first recess formed therein;

(d) a graduating valve carried fast in said recess so as to be movable axially with said piston member, said graduating valve having a front side, a back side, and a first planar surface extending therebetween and projecting beyond said face of said tailpiece;

(e) a slide valve carried by said piston member with relative movement therebetween, said slide valve having a second planar surface slidably engaged with said first planar surface;

(f) a first passage in said slide valve having an opening in said second planar surface, the opening of said first passage being uncovered by said back side of said graduating valve in said application position, whereby said auxiliary reservoir fluid under pressure is supplied from said opposite side of said piston member to said brake cylinder device when said piston member is actuated from a release position to said application position;

(g) a second passage in said slide valve via which fluid pressure communication is established between said opposite side of said piston member, said second passage having an opening in said second planar surface axially displaced from said opening of said first passage, said opening of said second passage being uncovered by said front side of said graduating valve in a lap position of said piston member intermediate said release and application positions, the axial dimension of said graduating valve between said front and back sides thereof being less than the distance said opening of said first passage is displaced from said opening of said second passage; and (h) said graduating valve having a lip portion projecting in an axial direction from at least one of said front and back sides of said graduating valve, said lip portion being flush with said first planar surface to thereby extend the axial length of said !first planar surface, whereby said opening of said second passage is uncovered by said front side of said graduating valve only after said opening of said first passage is covered by said back side of said graduating valve during said movement of said piston member from said application position to said lap position.

2. A control valve device, as recited in claim 1, wherein the axial dimension of said first planar surface is at least as great as the maximum axial distance said opening of said second passage is displaced from said opening of said first passage.

3. A control valve device, as recited in claim 1, wherein the axial dimension of said first planar surface is greater than the maximum axial distance said opening of said second passage is displaced from said opening of said first passage.

4. A control valve device, as recited in claim 3, wherein the minimum axial dimension of said first planar surface is 0.605 in.

5. A control valve device, as recited in claim 3, wherein the maximum axial dimension of said first planar surface is 0.648 in.

6. A control valve device, as recited in claim 1, wherein said lip portion projects from said back side of said graduating valve.

7. A control valve device, as recited in claim 1, wherein the dimension of said lip perpendicular to said first planar surface is less than the distance said first planar surface projects beyond said face of said tailpiece.

8. A control valve device, as recited in claim 1, wherein said second passage includes a choke.

9. A control valve device, as recited in claim 1, wherein the axial dimension of said graduating valve between said front and back sides thereof is substantially the same as the axial dimension of said recess to provide said fixed connection between said graduating valve and said piston member.

10. A control valve device, as recited in claim 1, further comprising:
   (a) a second recess in said face of said tailpiece, said first recess lying within the side walls of said second recess;
   (b) said slide valve being disposed in said second recess;
   (c) a stabilizing member carried by said tailpiece to provide one side wall of said second recess; and
   (d) a spring urging said stabilizing member toward engagement with said slide valve, to thereby provide said relative movement between said slide valve and said piston member.

11. For use on a railway car having a brake pipe charged with fluid at a certain chosen pressure, an auxiliary reservoir charged with fluid at said certain chosen pressure, a brake cylinder device, and a control valve device for controlling pressurization of said brake cylinder device, said control valve device comprising:
   (a) a piston member subject on one side thereof to the fluid pressure effective in said brake pipe and on the opposite side thereof to the fluid pressure effective in said auxiliary reservoir;
   (b) a tailpiece projecting from said opposite side of said piston member;
   (c) a face of said tailpiece having a first recess formed therein;
   (d) a graduating valve carried fast in said recess so as to be movable axially with said piston member, said graduating valve having a front side, a back side, and a first planar surface extending therebetween and projecting beyond said face of said tailpiece;
   (e) a slide valve carried by said piston member with relative movement therebetween, said slide valve having a second planar surface slidably engaged with said first planar surface;
   (f) a first passage in said slide valve having an opening in said second planar surface, the opening of said first passage being uncovered by said back side of said graduating valve in said application position, whereby said auxiliary reservoir fluid under pressure is supplied from said opposite side of said piston member to said brake cylinder device when said piston member is actuated from a release position to said application position;
   (g) a second passage in said slide valve via which fluid pressure communication is established between said opposite sides of said piston member, said second passage having an opening in said second planar surface axially displaced from said opening of said first passage a predetermined distance, said opening of said second passage being uncovered by said front side of said graduating valve in a lap position of said piston member intermediate said release and application positions;
   (h) an emergency reservoir;
   (i) a third passage in said slide valve via which said emergency reservoir is charged with fluid under pressure effective at said other side of said piston member, said third passage having an opening in said second planar surface axially displaced from said opening of said first passage a distance less than said predetermined distance said opening of said third passage being covered by said graduating valve in said lap position of said piston member; and
   (j) said first planar surface having an axial dimension at least as great as the maximum axial distance said opening of said second passage is displaced from said opening of said first passage, whereby said opening of said second passage is uncovered by said front side of said graduating valve only after said opening of said first passage is covered by said back side of said graduating valve during said movement of said graduating valve from said application position to said lap position.

12. A control valve device, as recited in claim 11, wherein the axial dimension of said first planar surface is greater than the maximum axial distance said opening of said second passage is displaced from said opening of said first passage.

13. A control valve device, as recited in claim 12, wherein the minimum axial dimension of said first planar surface is 0.605 in.

14. A control valve device, as recited in claim 12, wherein the maximum axial dimension of said first planar surface is 0.648 in.

15. A control valve device, as recited in claim 11, wherein said second passage includes a choke.

16. A control valve device, as recited in claim 11, wherein the axial dimension of said graduating valve between said front and back sides thereof is substantially the same as the axial dimension of said recess to provide said fixed connection between said graduating valve and said piston member.

17. A control valve device, as recited in claim 11, further comprising:
   (a) a second recess in said face of said tailpiece, said first recess lying within the side walls of said second recess;

(b) said slide valve being disposed in said second recess;
(c) a stabilizing member carried by said tailpiece to provide one side wall of said second recess; and
(d) a spring urging said stabilizing member toward engagement with said slide valve, to thereby provide said relative movement between said slide valve and said piston member.

* * * * *